(12) United States Patent
Hartsuiker et al.

(10) Patent No.: US 8,826,699 B2
(45) Date of Patent: Sep. 9, 2014

(54) METHOD AND DEVICE FOR MANUFACTURING A PRIMARY PREFORM FOR OPTICAL FIBRES

(75) Inventors: Johannes Antoon Hartsuiker, Eindhoven (NL); Igor Milicevic, Helmond (NL); Mattheus Jacobus Nicolaas Van Stralen, Tilburg (NL); Eric Aloysius Kuijpers, Eindhoven (NL)

(73) Assignee: Draka Comteq B.V., Amsterdam (NL)

( * ) Notice: Subject to any disclaimer, the term of this patent is extended or adjusted under 35 U.S.C. 154(b) by 435 days.

(21) Appl. No.: 12/845,295

(22) Filed: Jul. 28, 2010

(65) Prior Publication Data

US 2011/0023549 A1 Feb. 3, 2011

(30) Foreign Application Priority Data

Jul. 30, 2009 (NL) ...................................... 1037163

(51) Int. Cl.
*C03B 37/018* (2006.01)
(52) U.S. Cl.
CPC ....... *C03B 37/0183* (2013.01); *C03B 37/01815* (2013.01)
USPC ................... 65/417; 65/391; 65/418; 65/419; 65/420
(58) Field of Classification Search
USPC ............................. 65/391, 417, 418, 419, 420
See application file for complete search history.

(56) References Cited

U.S. PATENT DOCUMENTS

| 4,331,462 | A | 5/1982 | Fleming, Jr. et al. |
| 4,608,070 | A | 8/1986 | Roba |
| 4,740,225 | A | 4/1988 | Cocito et al. |
| 2003/0017262 | A1 | 1/2003 | Oh et al. |
| 2003/0056549 | A1* | 3/2003 | de Sandro et al. .............. 65/420 |
| 2005/0022561 | A1 | 2/2005 | Guskov et al. |
| 2008/0271494 | A1* | 11/2008 | Deckers et al. ................. 65/391 |

FOREIGN PATENT DOCUMENTS

| DE | 32 06 175 A1 | 8/1983 |
| DE | 36 19 379 A1 | 12/1986 |

OTHER PUBLICATIONS

European Patent Office Search Report dated Mar. 23, 2010 for NL Patent Application No. 1037163.

* cited by examiner

*Primary Examiner* — Queenie Dehghan
(74) *Attorney, Agent, or Firm* — Shumaker, Loop & Kendrick, LLP

(57) ABSTRACT

A method for manufacturing a primary preform for optical fibers using an internal vapor deposition process including the steps of providing a substrate tube having supply and discharge sides, surrounding at least part of the tube by a furnace, supplying glass-forming gases to the interior of the tube via the supply side, creating a reaction zone with conditions such that deposition of glass will take place on the inner surface of the tube, and moving the reaction zone back and forth along the length of the tube between reversal points near the supply and discharge sides to form one or more preform layers on the inner surface of the tube, wherein both reversal points are surrounded by the furnace.

8 Claims, 3 Drawing Sheets

METHOD AND DEVICE FOR MANUFACTURING A PRIMARY PREFORM FOR OPTICAL FIBRES

TECHNICAL FIELD AND BACKGROUND OF THE INVENTION

The present invention relates to a method for manufacturing a primary preform for optical fibres using an internal vapour deposition process, comprising the steps of:

i) providing a hollow glass substrate tube having a supply side and a discharge side, ii) surrounding at least part of the hollow glass substrate tube by a furnace, iii) supplying glass-forming gases to the interior of the hollow glass substrate tube via the supply side thereof, iv) creating a reaction zone with conditions such that deposition of glass will take place on the inner surface of the hollow glass substrate tube, and v) moving the reaction zone back and forth along the length of the hollow glass substrate tube between a reversal point located near the supply side and a reversal point located near the discharge side of the hollow glass substrate tube so as to form one or more preform layers on the inner surface of the hollow glass substrate tube, both of which reversal points are surrounded by the furnace.

A method as described in the introduction is known per se from U.S. Pat. No. 4,741,747. More in particular, the aforesaid patent discloses a method of fabricating optical preforms according to the PCVD method, wherein glass layers are deposited by moving a plasma back and forth between two points of reversal inside a glass tube whilst adding a reactive gas mixture to the tube at a temperature between 1100° C. and 1300° C. and a pressure between 1 and 30 hPa. The regions of nonconstant deposition geometry at the ends of the optical preform are reduced by moving the plasma nonlinearly with time in the area of at least one reversal point.

U.S. patent application US 2003/0017262 relates to an apparatus and method for manufacturing an optical fiber preform. From said US application it is known that two separate heat sources are positioned a predetermined distance apart, seen in the longitudinal direction of the substrate tube. The two heat sources are moved along the length of the substrate tube whilst maintaining the predetermined spacing during the MCVD (Modified Chemical Vapour Deposition) process.

U.S. Pat. No. 4,608,070 discloses a process for manufacturing a preform wherein the deposition process is carried out using a temperature profile, which temperature profile increases along the length of the substrate tube.

German Offenlegungsschrift DE 32 06 17 discloses a method for manufacturing a preform wherein a graphite furnace surrounds a substrate tube, which graphite furnace is provided with an additional heat source, which heat source functions as a pre-heater for the gas mixture to be supplied to the substrate tube. The two heat sources can be moved over the tube along the length thereof while maintaining the spacing between the two heat sources.

German Offenlegungsschrift DE 36 19 379 relates to a method and device for manufacturing a preform, wherein two co-axially arranged tubes can be heated and cooled independently so as to thus effect a temperature change.

U.S. Pat. No. 4,331,462 relates to a method for manufacturing a preform by means of an MCVD process, using a so-called tandem heating zone made up of a zone I and a zone II.

An optical fibre consists of a core and an outer layer surrounding said core, also referred to as cladding. The core usually has a higher refractive index than the cladding, so that light can be transported through the optical fibre.

The core of an optical fibre may consist of one or more concentric layers, each having a specific thickness and a specific refractive index or a specific refractive index gradient in radial direction.

An optical fibre having a core consisting of one or more concentric layers having a constant refractive index in radial direction is also referred to as a step-index optical fibre. The difference between the refractive index of a concentric layer and the refractive index of the cladding can be expressed in a so-called delta value, indicated $\Delta_i$ % and can be calculated according to the formula below:

$$\Delta_i \% = \frac{n_i^2 - n_{cl}^2}{2n_i^2}$$

where:
$n_i$=refractive index value of layer i
$n_{cl}$=refractive index value of the cladding An optical fibre can also be manufactured in such a manner that a core having a so-called gradient index refractive index profile is obtained. Such a radial refractive index profile is defined both with a delta value $\Delta$% and with a so-called alpha value $\alpha$. To determine the $\Delta$% value, use is made of the maximum refractive index in the core. The alpha value can be determined by means of the formula below:

$$n(r) = n_1 \left(1 - 2\Delta\% \left(\frac{r}{a}\right)^\alpha\right)^{\frac{1}{2}}$$

where:
$n_1$=refractive index value in the centre of het fibre
a=radius of the gradient index core [μm]
$\alpha$=alpha value
r=radial position in the fibre [μm]

A radial refractive index profile of an optical fibre is to be regarded as a representation of the refractive index as a function of the radial position in an optical fibre. Likewise it is possible to graphically represent the refractive index difference with the cladding as a function of the radial position in the optical fibre, which can also be regarded as a radial refractive index profile.

The form of the radial refractive index profile, and in particular the thicknesses of the concentric layers and the refractive index or the refractive index gradient in the radial direction of the core determine the optical properties of the optical fibre.

A primary preform comprises one or more preform layers which form the basis for the one or more concentric layers of the core and/or part of the cladding of the optical fibre that can be obtained from a final preform. A preform layer is built up of a number of glass layers.

A final preform as referred to herein is a preform from which an optical fibre is made by using a fibre drawing process.

To obtain a final preform, a primary preform is externally provided with an additional layer of glass, which additional layer of glass comprises the cladding or part of the cladding. Said additional layer of glass can be directly applied to the primary preform. It is also possible to place the primary preform in an already formed glass tube, also referred to as "jacket". Said jacket may be contracted onto the primary preform. Finally, a primary preform may comprise both the core and the cladding of an optical fibre, so that there is no need to apply an additional layer of glass. A primary preform is in that case identical to a final preform. A radial refractive index profile can be measured on a primary preform and/or on a final preform.

The length and diameter of a final preform determine the maximum length of optical fibre that can be obtained from the final preform.

To decrease the production costs of optical fibres and/or increase the output per primary preform, the object is to produce, on the basis of a final preform, a maximum length of optical fibre that meets the required quality standards.

The diameter of a final preform can be increased by applying a thicker layer of additional glass to a primary preform. Since the optical properties of an optical fibre are determined by the radial refractive index profile, the thickness of the layer of additional glass must at all times be in the correct proportion to the layer thickness of the preform layers of the primary preform that will form the core, more in particular the one or more concentric layers of the core in the optical fibre. Consequently, the layer thickness of the glass layer additionally applied to the primary preform is limited by the thickness of the preform layers being formed by means of the internal vapour deposition process.

The length of a final preform can be increased by increasing the length, more in particular the usable length, of a primary preform. The "usable length" is to be understood to be the length of the primary preform along which the optical properties remain within a predetermined tolerance limits, which tolerance limits have been selected so that optical fibres that meet the desired quality standards are obtained.

To determine the usable length of the primary preform, a radial refractive index profile is measured at a number of positions along the length thereof, after which it is possible, based on said measurements, to draw up a so-called longitudinal refractive index profile and a longitudinal geometry profile for each preform layer.

Thus a "longitudinal refractive index profile" is to be understood to be a graphic representation of the refractive index of a preform layer as a function of the longitudinal position in the primary preform.

A "longitudinal geometry profile" is to be understood to be a graphic representation of the thickness of a preform layer as a function of the longitudinal position in the primary preform.

One of the factors that adversely affect the usable length of a primary preform it is so-called "taper". The term "taper" is to be understood to be a deviation of the optical and/or geometric properties of the primary preform in regions near the ends thereof. A distinction is made between optical taper and geometric taper.

Optical taper relates to refractive index deviations, whilst geometric taper relates to deviations of the layer thickness of the preform layer.

If a primary preform is built up of several preform layers, the optical and geometric taper of the preform layers may be different from each other.

BRIEF SUMMARY OF THE INVENTION

It is an object of the present invention to provide a method and a device for manufacturing a primary preform in which the optical taper can be influenced practically independently of the geometric paper.

Another object of the present invention is to provide a method and a device for manufacturing a primary preform in which deviations of the longitudinal refractive index profile from a desired refractive index profile are minimized.

Yet another object of the present invention is to provide a method and a device for manufacturing a primary preform in which the refractive index of a preform layer can be influenced along the length of a primary preform during the deposition process.

The present invention as described in the introduction is characterised in that the furnace comprises at least two temperature zones, wherein a temperature or temperature gradient in one temperature zone can be set independently of a temperature or temperature gradient in the other zone(s), in which connection a "temperature zone" is to be understood to be a zone in the longitudinal direction of the hollow glass substrate tube. The present invention thus in particular relates to temperature zones which extend along the length of the substrate tube. It will be understood that, seen in radial direction, there may also be temperature gradients, but such gradients must not be confused with the present temperature zones.

The present inventors have found that the temperature of the substrate tube during the internal vapour deposition process has an influence on the refractive index. The temperature of the hollow glass substrate tube is understood to be the temperature of the hollow glass substrate tube, including the already deposited glass layers and/or preform layers. The temperature of the substrate tube corresponds to the temperature or the temperature gradient of the temperature zone in which the respective part of the hollow glass substrate tube is located. The present inventors have surprisingly found that the temperature of the substrate tube during the deposition process is of importance for the efficiency with which dopants are incorporated in the deposited glass. It should be noted that according to the present invention the reaction zone, which moves back and forth along the length of the substrate tube, is to be regarded as a separate part of the furnace, which furnace surrounds the substrate tube in a stationary position. Within the framework of the present invention the furnace must not be confused with the reaction zone that is required for the deposition.

More particularly, but without wishing to be bound by this theory, the present inventors assume that a higher temperature of the hollow glass substrate tube during the deposition process causes one or more dopants, in particular germanium oxide, to evaporate, or that the efficiency with which one or more dopants, viz. germanium in the form of germanium oxide, are incorporated in the glass decreases as a result of a high temperature. It should furthermore be noted that the reaction zone which can be moved back and forth along the length of the substrate tube is of vital importance in effecting deposition of glass on the inner surface of the hollow substrate tube.

It has been found that by thus providing the furnace with temperature zones in accordance with the present invention it is possible to create a temperature profile along the length of the substrate tube, more particularly the deposition length, such that the temperature of the hollow glass substrate tube is set at mutually different values along the deposition length thereof. The "deposition length" is to be understood to be the distance between a reversal point located near the supply side and a reversal point located near the discharge side of the hollow substrate tube. The deposition length therefore corresponds to the part of the length of the hollow glass substrate tube where glass layers are deposited.

The aforesaid temperature profile makes it possible to influence the refractive index along the length of the substrate tube, and consequently it is possible to reduce deviations of the refractive index of the deposited glass from a desired value along the length of the substrate tube.

The present inventors have thus found that it is possible, using this method, to increase the usable length of the primary preform in comparison with the usable length of a primary preform that has been made while using a substantially constant furnace temperature.

The present inventors have also found that the optical taper can be reduced without this having a significant effect on the geometric taper.

Thus, one or more of the above objects are accomplished by using the method according to the present invention.

In another preferred embodiment the internal vapour deposition process is a PCVD process, in which the reaction zone is a plasma which preferably moves back and forth along the deposition length of the hollow substrate tube in step v) at a velocity ranging between 10 and 40 m/min, preferably between 15 and 25 m/min.

In a preferred embodiment, the glass-forming gases used in step iii) comprise one or more dopants, preferably germanium. Said dopants influence the refractive index of the deposited glass. The refractive index of the deposited glass can be influenced by using dopants. Examples of dopants that increase the refractive index are germanium, phosphorus, titanium and aluminium, or the oxides thereof. Examples of dopants that decrease the refractive index are boron or the oxide thereof and fluorine. Preferably, germanium is used as a refractive index-increasing dopant and fluorine is used as a refractive index-decreasing dopant. In a special embodiment, a combination of germanium and fluorine is used as a dopant.

In another special embodiment of the method according to the present invention, the furnace comprises at least three temperature zones, which temperature zones each surround 5-20% of the deposition length near the supply side and the discharge side of the substrate tube. In the embodiment in which the deposition length is 1200 mm, the length of the temperature zones near the supply side and the discharge side of the substrate tube is 60-240 mm, therefore.

A furnace which comprises three or more temperature zones makes it possible to set the temperature of the substrate tube independently along the deposition length near the supply side, near the discharge side and the part of the deposition length therebetween. Thus, the optical taper near the supply side and the optical taper near the discharge side can be influenced independently of each other.

In another special embodiment, the furnace comprises at least four temperature zones, wherein a temperature or temperature gradient in one zone can be set independently of a temperature or temperature gradient in the other zone(s). In such an embodiment it is possible not only to influence the temperature of the substrate tube along the deposition length thereof near the supply side and the discharge side of the substrate tube, but also to divide the temperature in the region therebetween into at least two temperature zones and to set the temperature in said temperature zones independently of another temperature zone.

In a special embodiment of the method according to the invention, the maximum temperature difference between one temperature zone and another temperature zone is greater than 50° C.

In yet another special embodiment of the method according to the present invention, several preform layers are formed in step v) and the temperature or the temperature gradient in the temperature zones during the formation of one preform layer can be set independently of the temperature or the temperature gradient in the temperature zones during the formation of the one or more other preform layers.

This embodiment makes it possible to set an optimum temperature profile along the deposition length of the hollow glass substrate tube for each preform layer in situations where preform layers with mutually different dopant levels are used.

The present invention further relates to a device for manufacturing a primary preform for optical fibres, using an internal vapour deposition process in a hollow glass substrate tube having a supply side and a discharge side, which device comprises i) a gas inlet and a gas outlet, between which the hollow glass substrate tube can be mounted, ii) a furnace which surrounds the hollow glass substrate tube at least along a deposition length thereof, iii) means for creating a reaction zone inside the hollow glass substrate tube, which means are disposed in the furnace during the deposition process and which can be moved back and forth between the reversal point located near the supply side and the reversal point located near the discharge side of the hollow glass substrate tube, characterised in that the furnace comprises at least two temperature zones, wherein a temperature or temperature gradient in one temperature zone can be set independently of a temperature or temperature gradient in the other zone(s).

In a preferred embodiment, the means for creating a reaction zone comprise a resonator which is capable of coupling microwaves into the interior of the hollow glass substrate tube so as to create a reaction zone in the form of a plasma.

In yet another preferred embodiment, the furnace comprises three or more temperature zones, which temperature zones each surround 5-20% of the deposition length near the supply side and the discharge side of the substrate tube.

BRIEF DESCRIPTION OF THE FIGURES

The present invention will now be explained in more detail by means of an example with reference to a number of figures, in which connection it should be noted, however, that the present invention is by no means limited thereto.

DETAILED DESCRIPTION OF THE INVENTION

Figure 1:
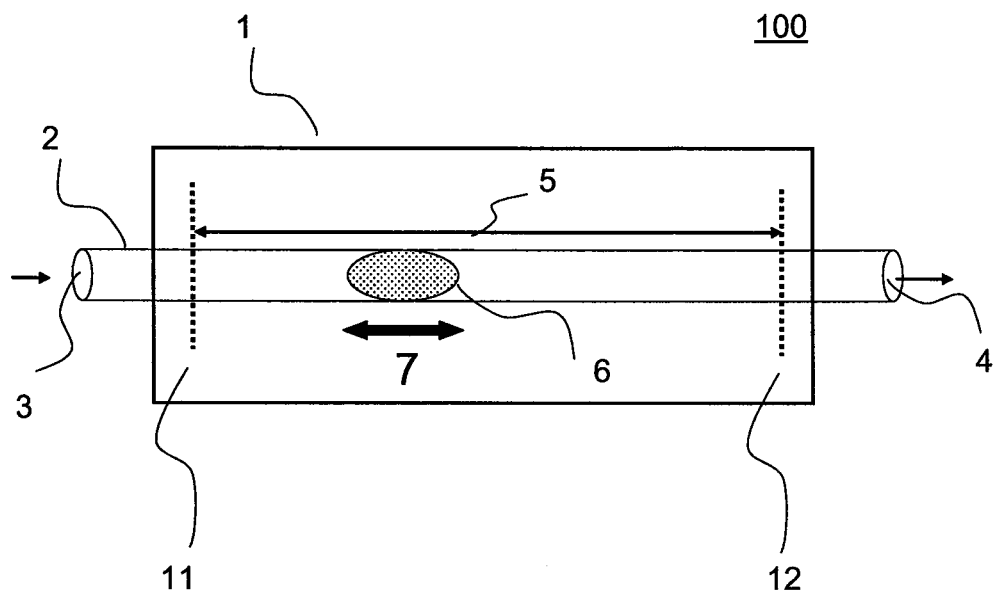
FIG. 1 is a schematic view of a device for carrying out an internal deposition process.

In FIG. 1 a device 100 for carrying out an internal vapour deposition process for the manufacture of a primary preform for optical fibres is schematically shown. The device 100 comprises a furnace 1, which surrounds at least the deposition length 5 of a hollow glass substrate tube 2.

The deposition length 5 corresponds to the part of the length of the hollow glass substrate tube 2 where glass layers are deposited. In other words, the deposition length 5 corresponds to the distance between the reversal point 11 located near the supply side and the reversal point 12 located near the discharge side of the hollow substrate tube. The reversal point is to be understood to be a position in the longitudinal direction of the hollow glass substrate tube 2 where the direction of movement of the reaction zone 6 is reversed in the opposite direction.

The furnace 1 surrounds the deposition length 5 during the deposition process, viz. at least during step v). After completion of the deposition process, the substrate tube 2 is removed from the furnace 1 and further processed.

The hollow glass substrate tube 2 has a supply side 3 and a discharge side 4. The supply side 3 and the discharge side 4 can be positioned between a gas inlet and a gas outlet, respectively (not shown). The supply side 3 and the discharge side 4 may be clamped down thereon via a cylindrical passage provided with an O-ring seal, so that the internal volume of the hollow glass substrate tube 2 is isolated from the outside atmosphere. Such a construction makes it possible to carry out the deposition process at a reduced pressure when a pump (not shown) is connected to the gas outlet.

The aforesaid cylindrical passage may also be used in a rotary embodiment, so that the substrate tube can be rotated continuously or in steps during the deposition process.

During the vapour deposition process a reaction zone 6 moves back and forth along the length of the hollow glass substrate tube 2 between a reversal point 11 located near the supply side 3 and a reversal point 12 located near the discharge side 4, which length is also referred to as the deposition length 5, inside the hollow glass substrate tube 2 so as to form glass layers. The width 7 of the reaction zone 6 is smaller than the deposition length 5. The present invention is in particular suitable for use in a PCVD-type deposition process, in which the reaction zone is a low-pressure plasma. The term "low pressure" is understood to mean that the plasma is created at a pressure of about 1-20 mbar in the substrate tube.

While glass-forming gases, which may or may not be doped, are being supplied to the supply side 3 of the hollow glass substrate tube 2, glass layers (not shown) are deposited along the deposition length 5 on the inner surface of the hollow glass substrate tube 2.

A number of glass layers deposited using a more or less constant composition of the glass-forming gases being supplied on the supply side 3 thus form a preform layer.

It is also possible to form a preform layer by using a predetermined variation in the composition of the glass-forming gases. Such a preform layer is for example used for manufacturing a primary preform for gradient index type optical fibres.

After completion of the deposition process, the substrate tube 2 with the preform layer/layers deposited therein can be consolidated into a solid rod by means of a contraction process, also referred to as a collapse process.

Means for creating a reaction zone inside the hollow glass substrate tube 2 preferably comprise a resonator, as known for example from the U.S. patent applications published under Nos. US 2007/0289532, US 2003/0159781 and US 2005/0172902. U.S. Pat. Nos. 4,844,007, 4,714,589, 4,877,938. Such resonators enclose the substrate tube 2 and are moved back and forth along the deposition length during the deposition process.

Figure 2:
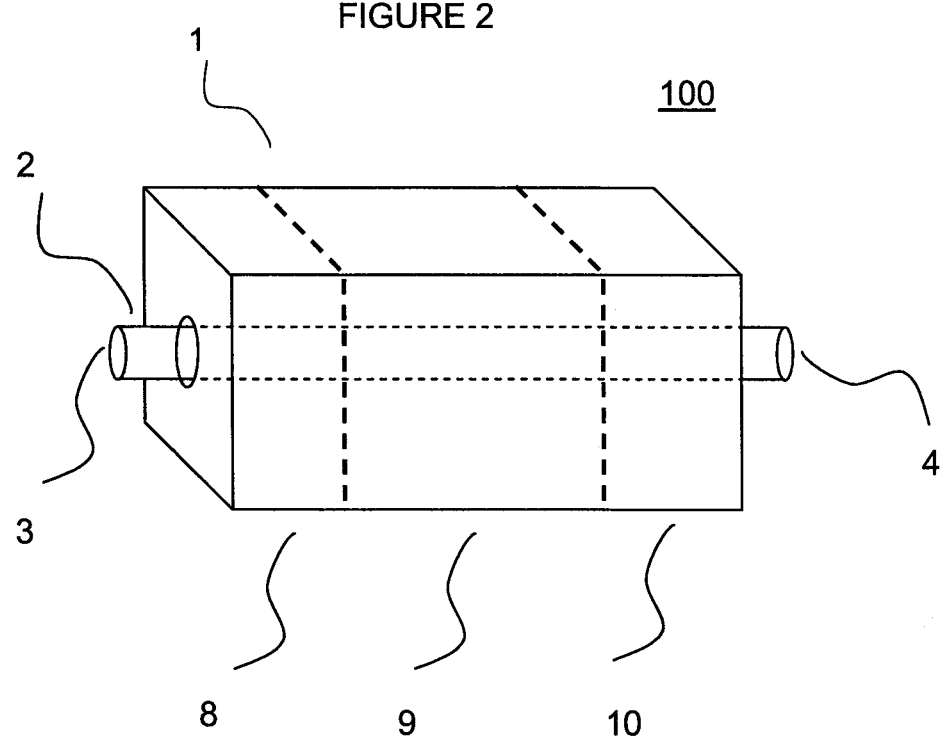
FIG. 2 is a schematic, perspective view of a device for carrying out an internal deposition process in accordance with the present invention.

FIG. 2 is a perspective view of a special embodiment of the device 100, in which three temperature zones 8, 9 and 10 are schematically shown. The temperature zones 8, 9 and 10 can for example be created by disposing individually controllable heating elements (not shown) in the furnace 1 at various positions in the longitudinal direction of the substrate tube. Carbon elements, for example, are suitable heating elements. The present invention is not limited to carbon elements, however. In principle, heating elements capable of reaching a maximum temperature of about 1400° C. are suitable. The width of the temperature zones can be set as needed and is not necessarily the same for each temperature zone. To achieve a precise setting of the temperature of the substrate tube in longitudinal direction, it may be desirable to realise temperature zones of mutually different length.

The temperature zones 8, 9, 10 may be separated from each other by one or more separating elements (not shown) made of an insulating material, for example aluminium oxide. The use of insulating separating elements makes it possible the maintain a constant temperature of the substrate tube 2 in a temperature zone. The absence of insulating separating elements will lead to variations in the temperature of the substrate tube 2, in particular near the transition(s) between the adjacent temperature zone(s). Although FIG. 2 shows a furnace comprising three temperature zones 8, 9 and 10, the present invention is by no means limited to such an embodiment.

Comparative Example

Figure 3:
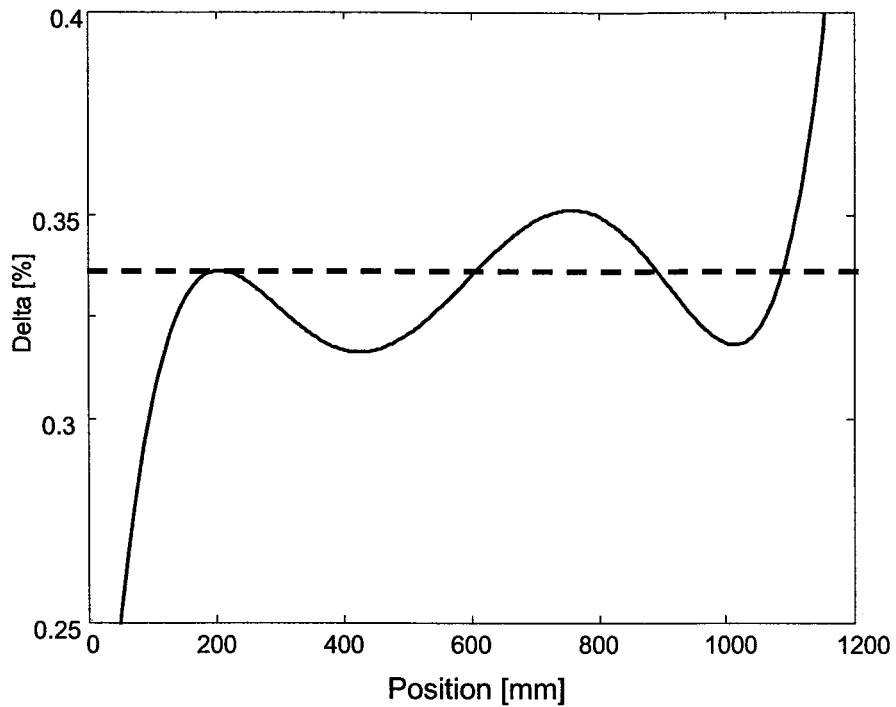
FIG. 3 is a representation of a longitudinal refractive index profile in a primary preform.

A step-index type primary preform comprising one preform layer is produced, using a prior art plasma chemical vapour deposition process (PCVD), in which the temperature in the furnace 1 is maintained at a substantially constant value along the length of the hollow glass substrate tube and in which germanium is used as a dopant so as to obtain a desired refractive index difference of 0.335%. Upon completion of the vapour deposition process, the resulting hollow glass substrate tube 2 is consolidated into a primary preform, after which the radial refractive index profile is measured at a number of positions along the length of the primary preform, using a so-called "preform analyzer", for example a "2600 Preform Analyser", which is commercially available from Photon Kinetics. Subsequently, a longitudinal refractive index is determined for the preform layer in the primary preform on the basis of the obtained radial refractive index profiles. In this way a longitudinal refractive index profile as shown in FIG. 3 is obtained. The refractive index difference, Delta % (Δ%), is shown on the vertical axis, and the position in the longitudinal direction of the primary preform is shown on the horizontal axis. The aimed-at or desired value, represented by means of the broken horizontal line, for $\Delta_i$ % is 0.335%.

FIG. 3 clearly shows that the obtained value for Δ% deviates from the desired value along the length of the primary preform.

In particular the deviation at the ends of the primary preform (corresponding to the left and at right-hand side of FIG. 3) leads to a significant reduction of the usable length of the primary preform.

Example

Based on the longitudinal refractive index profile shown in FIG. 3, a (longitudinal) temperature profile is subsequently determined for the furnace 1, using a computer model, which temperature profile is used to reduce the deviations of the refractive index (expressed as Δ%) from a desired value, which is 0.335% in the present example.

Figure 4:
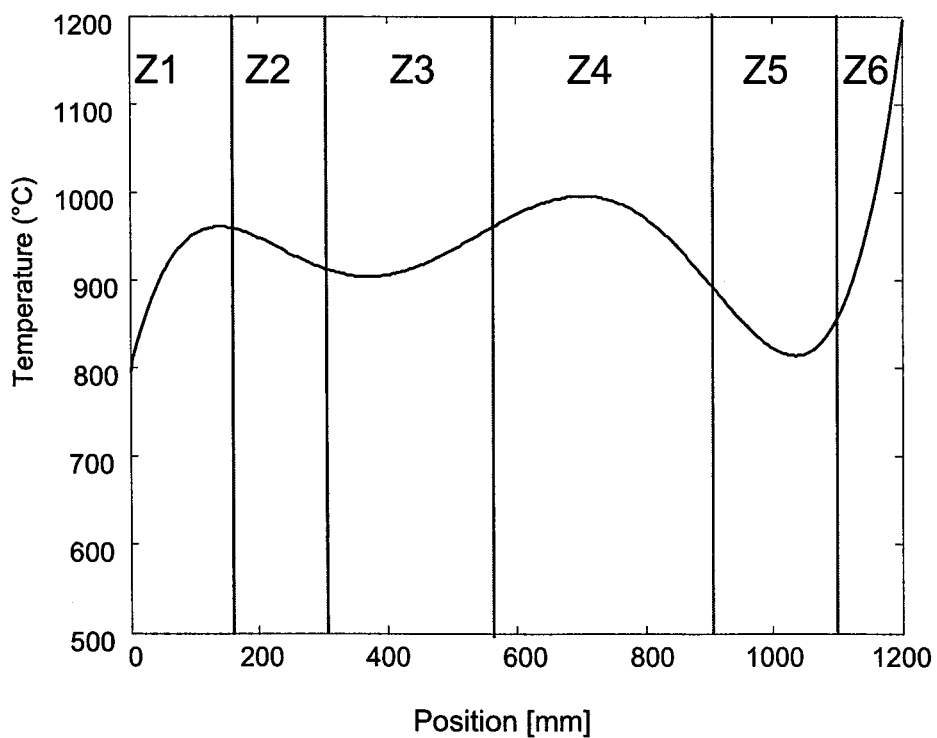
FIG. 4 is a representation of a temperature profile in a furnace.

The thus determined temperature profile is shown in FIG. 4, in which the furnace temperature is shown on the vertical axis and the position in the primary preform is shown on the horizontal axis. The position in the primary preform shown in FIG. 3 corresponds to the position of the hollow glass substrate tube 2 in FIG. 4.

The vertical full lines in FIG. 4 correspond to the six temperature zones Z1-Z6. Thus, temperature zone Z2 starts at a position of 160 mm and ends at a position of 310 mm, zone Z3 starts at a position of 310 mm and ends at a position of 575 mm, etc. It is noted that the present invention is not limited to an embodiment comprising six temperature zones.

It is further noted that the temperature zones are not separated by insulating partitions, so that a more or less smooth temperature transition occurs between adjacent temperature zones.

From FIG. 3 it can be derived, for example, that the refractive index difference is lower than the desired value (0.335%) in the larger part of the temperature zone Z3, whilst in the larger part of the temperature zone Z4, on the other hand, the refractive index difference is higher than the desired value. Based on these results it is desirable for the temperature in the respective temperature zones Z3 and Z4 to be set so that the above deviation is reduced.

Figure 5:
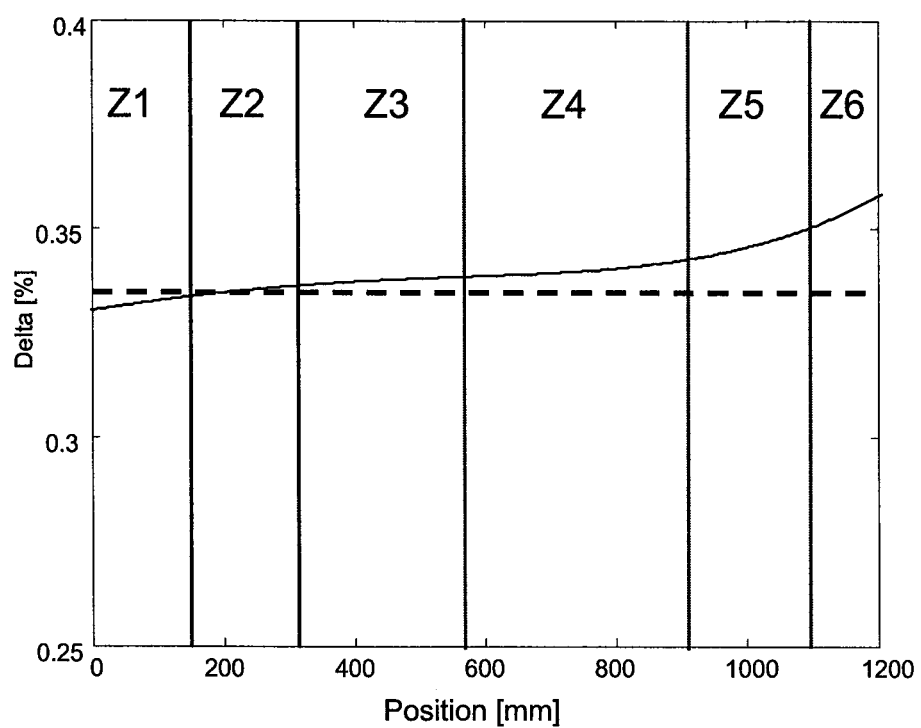
FIG. 5 is a representation of a corrected longitudinal refractive index profile.

Thus it is possible, based on the temperature profile shown in FIG. 4, to manufacture a preform having a longitudinal refractive index profile corresponding to the longitudinal refractive index profile shown in FIG. 5. The refractive index difference, Δ%, is shown on the vertical axis in FIG. 5 and the position in the longitudinal direction of the primary preform is shown on the horizontal axis.

It is quite apparent that in comparison with the deviations shown in FIG. 3, the deviations of the Δ% are significantly reduced in relation to the set value of 0.335% along substantially the entire length of the primary preform.

In particular FIG. 5 shows that the deviation of the refractive index difference at the ends of the primary preform has been significantly reduced. The methods and the device according to the present invention thus make it possible to increase the usable length of a primary preform.

The invention claimed is:

1. A method for manufacturing a primary preform for optical fibres using an internal vapour deposition process, comprising the steps of:
    i) providing a hollow glass substrate tube having a supply side and a discharge side,
    ii) surrounding at least part of the hollow glass substrate tube by a furnace,
    iii) supplying glass-forming gases to the interior of the hollow glass substrate tube via the supply side thereof,
    iv) creating a reaction zone in the form of a plasma with a resonator configured to couple microwaves into the interior of the hollow glass substrate tube to create conditions such that deposition of glass will take place on the inner surface of the hollow glass substrate tube, and
    v) moving the reaction zone back and forth along the length of the hollow glass substrate tube between a reversal point located near the supply side and a reversal point located near the discharge side of the hollow glass substrate tube so as to form one or more preform layers on the inner surface of the hollow glass substrate tube, both of which reversal points are surrounded by the furnace,
    wherein the furnace comprises at least three different temperature zones along the length of the substrate tube in the longitudinal direction, a first temperature zone located near the reversal point of the supply side, a second temperature zone located near the reversal point of the discharge side, and a third temperature zone being located in between the first and second temperature zones,
    wherein a temperature or temperature gradient in one temperature zone is set independently of and is different from a temperature or temperature gradient in the other zone(s) such that a temperature profile is created along the length of the hollow glass substrate tube and a preform layer formed in step v) is subjected to the different temperature zones during its formation to minimize deviations in the refractive index profile of the preform layer along its length, wherein the temperature profile is non-monotonic.

2. A method according to claim 1, wherein in step v) the reaction zone moves back and forth at a velocity ranging between 10 and 40 m/min along the deposition length of the hollow glass substrate tube, which deposition length is to be regarded as the distance between the reversal point located near the supply side and the reversal point located near the discharge side of the hollow glass substrate tube.

3. A method according to claim 1, wherein the glass-forming gases used in step iii) comprise one or more dopants.

4. A method according to claim 3, wherein germanium is used as a dopant.

5. A method according to claim 1, wherein the furnace comprises at least three temperature zones, which temperature zones each comprise 5-20% of the deposition length, at least some of the temperature zones being positioned near one of the supply and discharge sides of the hollow glass substrate tube.

6. A method according to claim 1, wherein the maximum temperature difference between one temperature zone and another temperature zone is greater than 50° C.

7. A method according to claim 1, wherein in step v) the reaction zone moves back and forth at a velocity ranging between 15 and 25 m/min along the deposition length of the hollow glass substrate tube, which deposition length is to be regarded as the distance between the reversal point located near the supply side and the reversal point located near the discharge side of the hollow glass substrate tube.

8. A method according to claim 1, wherein the furnace comprises at least four temperature zones, which temperature zones each comprise 5-20% of the deposition length, at least some of the temperature zones being positioned near one of the supply and discharge sides of the hollow glass substrate tube.

* * * * *